Feb. 26, 1963 D. C. BEATTY 3,079,466

AUTOMATIC TELEPHONE DIALING DEVICE

Filed Jan. 16, 1958 4 Sheets-Sheet 1

INVENTOR.
DONALD C. BEATTY
BY
Trachtman & Zoda
ATTORNEYS

Feb. 26, 1963 D. C. BEATTY 3,079,466

AUTOMATIC TELEPHONE DIALING DEVICE

Filed Jan. 16, 1958 4 Sheets-Sheet 2

INVENTOR.
DONALD C. BEATTY
BY
Trachtman & Zoda
ATTORNEYS

Feb. 26, 1963 D. C. BEATTY 3,079,466

AUTOMATIC TELEPHONE DIALING DEVICE

Filed Jan. 16, 1958 4 Sheets-Sheet 3

INVENTOR.
DONALD C. BEATTY
BY
Trachtman & Zoda
ATTORNEYS

INVENTOR.
DONALD C. BEATTY
BY
Trachtman & Zoda
ATTORNEYS 3,079,466
Patented Feb. 26, 1963

3,079,466

AUTOMATIC TELEPHONE DIALING DEVICE

Donald C. Beatty, 2800 Overhill Road, Birmingham 9, Ala.

Filed Jan. 16, 1958, Ser. No. 709,315
9 Claims. (Cl. 179—90)

This invention relates generally to devices for dialing telephone numbers. More particularly, the invention has reference to an automatic dialing device, having as an important characteristic thereof the feature of being almost purely electrical in nature, as distinguished from being basically mechanical.

Automatic dialing devices for telephones have heretofore been proposed. However, so far as is known none of these has, at least to date, found commercial favor. Possibly, this may be due to the fact that some of the dialing devices of which I have knowledge are relatively complex in construction, a characteristic which naturally tends to militate against manufacture and distribution of the same at a cost sufficiently low to attract those who would make use of devices of this nature.

In this connection, the devices previously conceived for the indicated purpose have, in general, been basically mechanical in nature. This may quite possibly be one of the main factors that have tended to detract from the possibilities of successful commercial production, since devices that are comprised of a large number of interacting components connected for relative mechanical movement are costly to assemble, install, and repair. Even so, such devices are prone toward breakdowns, while also comprising rather unattractive, bulky attachments to a telephone instrument.

Summarized briefly, the present invention, having as its object the provision of a generally improved automatic dialing device for telephones, comprises a compact, simply designed assemblage of mainly electrical components all of which may be completely concealed from view, without being in close proximity to the telephone instrument with which the device is associated, that is, the instrument having the dialing mechanism for which the invention is substituted whenever it is placed in operation for the purpose of dialing a pre-selected telephone number automatically.

Essentially, the invention comprises, in combination with an ordinary telephone loop circuit, a series of electrical connections or circuits which respond to the momentary closing of a switch, in a manner to energize an electric motor. Driven by the electric motor is at least one dialing member, which in a preferred embodiment comprises a flat, circular cam having a series of radial projections. The dialing member is thus formed in such a way that when driven by the motor, it produces the biasing of adjacent switch contacts to open position, a predetermined number of times occurring at predetermined intervals.

The switch contacts, when opened in the manner described, produce interruptions in the telephone loop circuit corresponding to those that would occur in said circuit if the pre-selected number were being manually rather than automatically dialed. Thereafter, on completion of the dialing operation, the device returns to a standby condition, by reason of operation of a motor-deenergizing means set to operate following completion of the dialing action.

Since the invention responds to the momentary closing of a switch in a manner to cause operation of the device through a complete cycle of dialing a selected telephone number bearing correspondence to said switch, the device has marked versatility as to the various environments in which it can be employed to advantage. Thus, the device may be installed in a manner to cause operation responsive to depression of a push button by a user. Then again, the starting switch may be incorporated in a fire alarm system, in a manner such as to cause such switch to be closed, even momentarily, by thermostatic action resulting from the elevation of temperatures above a safe level. In this way, the device may be caused to automatically dial the number of a fire department, and it thus becomes possible to use, in association with the dialing device, a machine for delivering to the called party a pre-recorded message advising of the location at which the fire has developed.

The device, as will be readily understood, could also be used in association with a burglar alarm system. In this instance, the starting switch would be caused to operate responsive to the opening or closing of an alarm circuit, produced by unauthorized entry into a commercial establishment or home. Here again, it is possible to couple with the device an apparatus for delivering a recorded message, so that the police department or other party automatically dialed by the device will be given appropriate information as to the location of the illegal entry.

It is not found necessary to describe herein the ramifications of these various, typical applications of the invention. Obviously, the automatic starting of the dialing device constituting the present invention, and the possibility of incorporating a device for delivering recorded messages, permit substantial broadening or extension of the functional characteristics of the invention. For example, when the device is used in association with a burglar alarm apparatus, it is not only possible to cause a pre-recorded message to be delivered to the police department. Instead of or in addition to this arrangement, there can be utilized an arrangement wherein an ultra-sensitive microphone may be caused to pick up sounds created by those participating in the illegal entry. These sounds may be transmitted through the telephone loop circuit with which the automatic dialing device constituting the present invention is associated. The sounds may be transmitted through said circuit to the police department or other party automatically dialed by the device, and there automatically broadcast to all cruising police cars. In this way, valuable intelligence can be obtained as to the number and identity of the criminals, and of the progress of the burglary, while one or more police cars are en route to the scene.

These various, typical installations are all possible when the device constituting the present invention is used, and are mentioned solely for the purpose of bringing out clearly the fact that the almost purely electrical nature of the invention, its swift and easy, conductive coupling to ordinary power circuits and telephone loop circuits, and its characteristic of responding to momentary closing of a switch in a manner to go through a complete, automatic, dialing cycle, impart to the construction a high degree of versatility and a wide range of possible applications.

Other objects will appear from the following description, the claims appended thereto, and from the annexed drawings, in which like reference characters designate like parts throughout the several views, and wherein:

Figures 1, 2, 5:
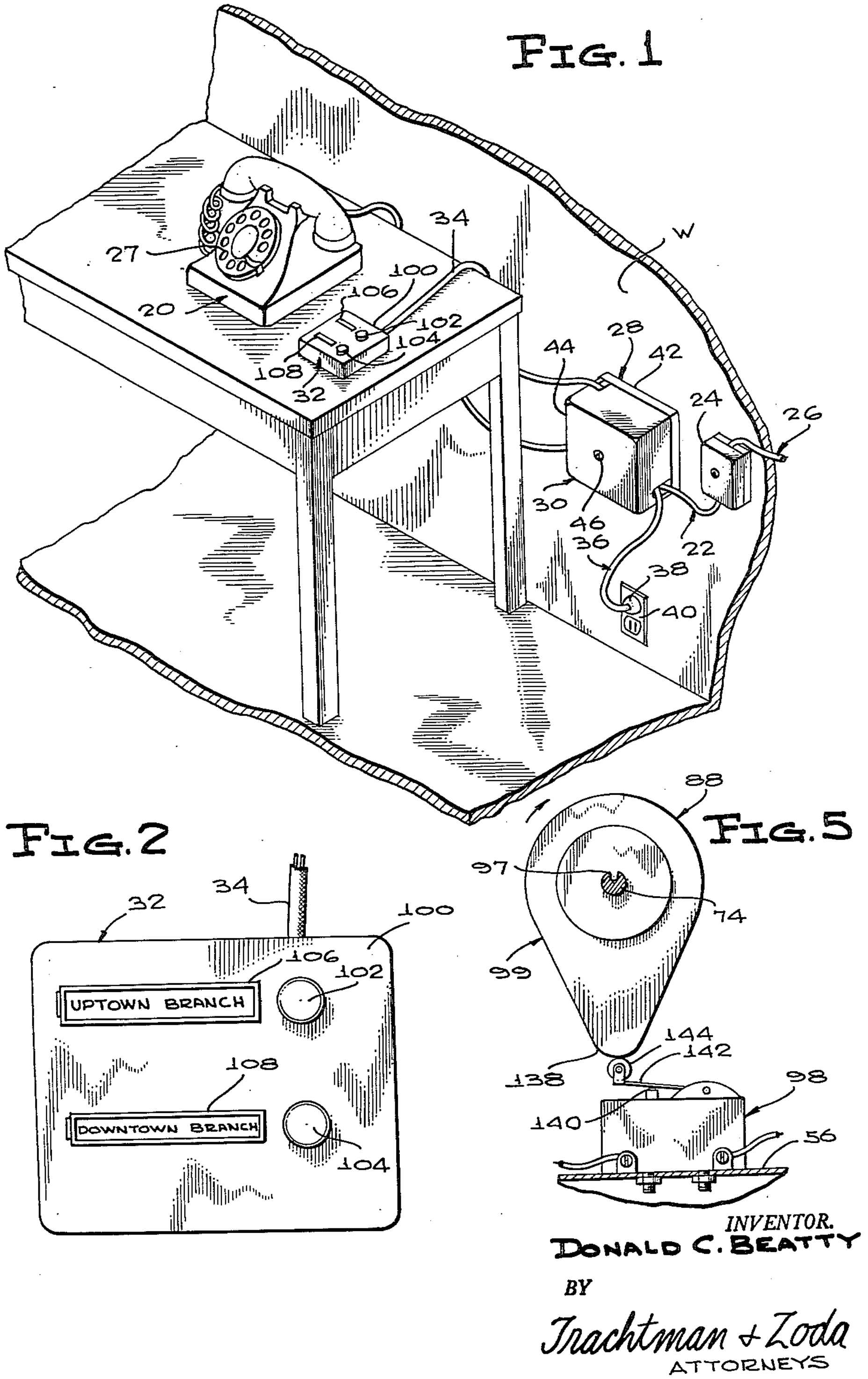
FIGURE 1 is a fragmentary perspective view illustrating one form of the invention in association with a conventional telephone instrument.
FIGURE 2 is a top plan view, on an enlarged scale, of a telephone number selection switch unit incorporated in the form of the invention shown in FIGURE 1.
FIGURE 5 is a transverse sectional view showing the turn-off cam means, taken substantially on line 5—5 of FIGURE 3, on the same scale as FIGURE 3.

Designated generally at 20 is a wholly conventional telephone instrument of the dial-equipped type, from which extends the conventional cord 22 containing the leads of the telephone loop circuit. Cord 22 in the illustrated example extends to a box 24 in which connection is made to the leads of a cord 26 extending to the central telephone switching office, not shown. Manual operation of the dial 27 of the instrument 20 is adapted to cause opening and closing of "pulsing" contacts of the conventional dial mechanism. These open and close a predetermined number of times, at predetermined intervals, to interrupt current within the telephone loop circuit a corresponding number of times and at corresponding intervals. This activates and causes the operation of devices located at the central office in a manner such as to establish an electrical connection with the desired distant telephone.

At 28, I have generally designated the automatic dialing device constituting the present invention. At this point, it will be understood that physically, the device may take an almost limitless variety of forms. This would depend, most certainly, on the particular type of installation desired, on the desires of the manufacturer or lessor of the equipment and on the type of equipment with which the invention is to be used. Therefore, the illustrated example of the invention is intended to exhibit merely one possible commercial form and application of the device among many that are obviously to be considered as embraced within the scope of the appended claims.

In the illustrated example, the device is shown as a wall-mounted unit or assembly 30, containing most of the components of the invention, and a selection switch unit or assembly generally designated at 32, which can be disposed remote from assembly 30, in close proximity to the telephone instrument. In other words, in the illustrated example, there is shown a typical home or office installation of the invention, designed to permit one to cause the automatic dialing of a selected distant telephone responsive merely to manual depression of a push button.

Unit 32 includes a cord 34 extending to the main unit or assembly 30. Extending from the assembly 30 is a power cord 36, having a conventional attachment plug cap 38 engageable in duplex receptacle 40 mounted in wall W and representing a source of electrical power.

Figures 3, 4:
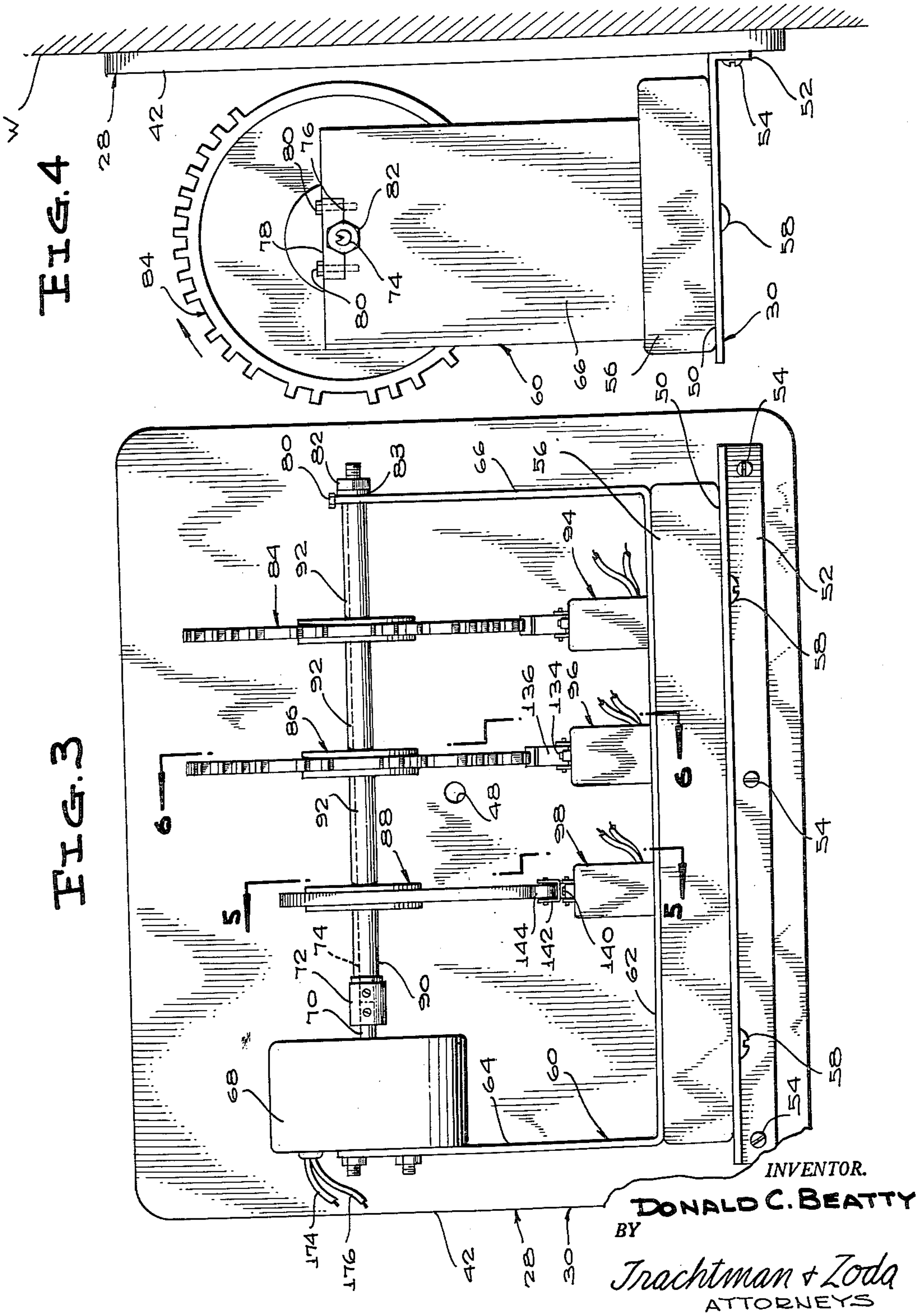
FIGURE 3 is an enlarged front elevational view of the main unit of the automatic dialing device constituting the present invention, with the cover removed, on an enlarged scale.
FIGURE 4 is a view of the device as seen from the right of FIGURE 3, on the same scale as FIGURE 3.

Referring to FIGURES 3 and 4, the wall-mounted device illustrated by way of example includes a support or back plate 42, fixedly attached to wall W. A rectangular cover 44 is connected to the back plate, cooperating with the back plate in forming a housing for the operating components of the device. Cover 44 may be secured to the back plate by a centrally disposed connecting bolt 46, extending through a smooth-walled opening of the cover and engaged threadedly in a threaded opening 48 centrally provided (see FIGURE 3) in the back plate.

A horizontally disposed support ledge 50 projects forwardly from the lower portion of the back plate 42, and has along its rear edge a depending mounting flange 52 secured to the back plate 42 by a plurality of screws 54 or equivalent fastening elements.

A rectangular, hollow chassis 56 is mounted upon ledge 50, being secured fixedly thereto by screws 58. It will be understood, in this connection, that the chassis 56 contains all the various wiring components of the device, other than those specifically illustrated and described as being located exteriorly of the chassis. Again, it is pointed out that this is merely one typical embodiment of the invention, and the construction illustrated is not to be considered as that which is necessarily desirable in various commercial forms of the invention.

Fixedly mounted upon the chassis 56 is a frame generally designated 60, formed to a U-shape from a wide, flat length of metal material. The frame, thus, includes a horizontal base or bight portion 62, and vertical end walls 64, 66 extending upwardly from the opposite ends of the base.

Mounted upon end wall 64 is a small electric motor 68. This might be, for example, a motor such as that found in a small electric clock. The motor could be some other related type of gearhead motor, it being understood that the actual motor size would be dependent upon the number of cams (these will be described in detail hereinafter) that the motor must drive, taken in relation to the amount of torque delivered to the motor shaft.

In any event, in the illustrated example, the shaft 70 of the motor is drivingly connected by a coupling 72 to an elongated shaft 74. Shaft 74 extends to and slightly beyond end wall 66, which has at its upper end a rectangular recess 76 (see FIGURE 4) closed by a bearing element 78, which is secured in place by screws 80 threaded into the end wall. Shaft 74 is rotatably engaged between element 78 and the body portion of end wall 66, and in the illustrated example, is threaded at its end to receive a retaining nut 82 bearing against a spacer washer 83.

Designated generally at 84, 86 respectively are dialing members driven by the motor 68. In the illustrated example, these are in the form of flat, rotary cams or discs, and each constitutes a cam means that is adapted to automatically produce interruptions in the telephone loop circuit when the device goes into its cycle of operation.

It may be noted that two cam discs 84, 86 are shown by way of example. The number, however, will obviously depend upon the particular situation. If, as in the illustrated example, it is desired to provide automatic dialing of only two telephone numbers, there would be two cam discs, as shown. The device would work with one cam disc, if only one number is to be automatically dialed. Further, it operates with any number, greater than the two discs shown, if the circumstances of the particular installation make this desirable.

Still further, the construction permits cam discs to be added or removed, from time to time. This characteristic of the invention will be discussed in greater detail hereinafter.

Also driven by the motor 68, conjointly with cam discs 84, 86, is a power turn-off cam generally designated 88.

The several cams are spaced longitudinally of shaft 74, through the provision of spacer sleeves 90, 92, the length of which would depend upon the number of cams driven by the shaft, and the spacing between the cams.

Associated with the cams 84, 86, 88 are normally open switches or sets of pulsing contacts 94, 96, 98 respectively. The switches 94, 96 define means for opening and closing a telephone loop circuit for the purpose of providing interruptions in said circuit corresponding to those resulting from manual dialing of a telephone number. Switch 98 is a turn-off switch, adapted for effecting return of the entire device to an inoperative, standby condition, in a manner to be described in detail hereinafter. Thus, cam 88 and switch 98 together constitute a means generally designated at 99 for deenergizing motor 68.

The chassis 56 can be provided with a plurality of closely spaced openings in its top wall, designed to permit the connection of the switches thereto at any selected location, according to the number and spacing of switches used. In other words, the placement of switches, the selection of the number of switches, and other factors that may change from one installation to another, are simplified by the particular arrangement.

This is also true with respect to the dialing cams. Shaft 74, as will be noted from FIGURES 5 and 6, has a longitudinally extending groove or keyway 97, and each cam has a radially inwardly extending projection formed on the wall of its shaft-receiving center opening. The projection slides in the keyway, and therefore, cams can be applied to the shaft from the right hand end of the shaft 74, viewing the same as in FIGURE 3, and can be slidably moved to their assigned positions along the shaft, said cams alternating with spacers also slidably positioned upon shaft 74. During the application or removal of cams, the piece 78 can be removed, permitting the removal of the shaft from the coupling 72. All this, of course, is designed to facilitate the work of the installer, as well as the inexpensive assembly of a device for a particular user.

Referring now to FIGURES 1 and 2, in the illustrated example the selection switch unit 32 includes a housing 100, in which would be contained push button switches 102, 104. Alongside the depressible buttons of said switches are small tab holders containing tabs 106, 108 on which would be inscribed identifying information as to numbers that can be automatically dialed.

Of course, such information would vary, in any manner desired by the user. The actual numbers could be imprinted on the tabs. Then again, names of parties called, or branch offices of a particular business (this is the example given in FIGURE 2) could be used. For example, a commercial establishment such as a large bank having branches spread out over a substantial geographical area would have employees who are required to be in contact at many times during each day, with one or more branches. Such employees might be equipped with telephones having associated therewith automatic dialing devices according to the present invention. Each push button may have next to the same a tab containing the name of the branch the telephone number of which is to be dialed.

It is appropriate now to consider the particular construction of each dialing member or cam. Cam 86 is typical, and accordingly will be described in full detail. Cam 84 would be similarly formed, except of course for the number and relative arrangement of switch-operating projections provided on the periphery thereof.

Each cam is formed of molded plastic or similar material, in a typical embodiment, and has a circular configuration. The edge 109 of each cam is formed in a manner to operate the associated switch, having for this purpose a plurality of small, radially extending projections 110 that provide cam surfaces on the disc.

The projections 110 are grouped in a plurality of sets 112, 114, 116, 118, 120, 122, and 124. Each set contains one to ten projections 110.

Figures 6, 7, 8:
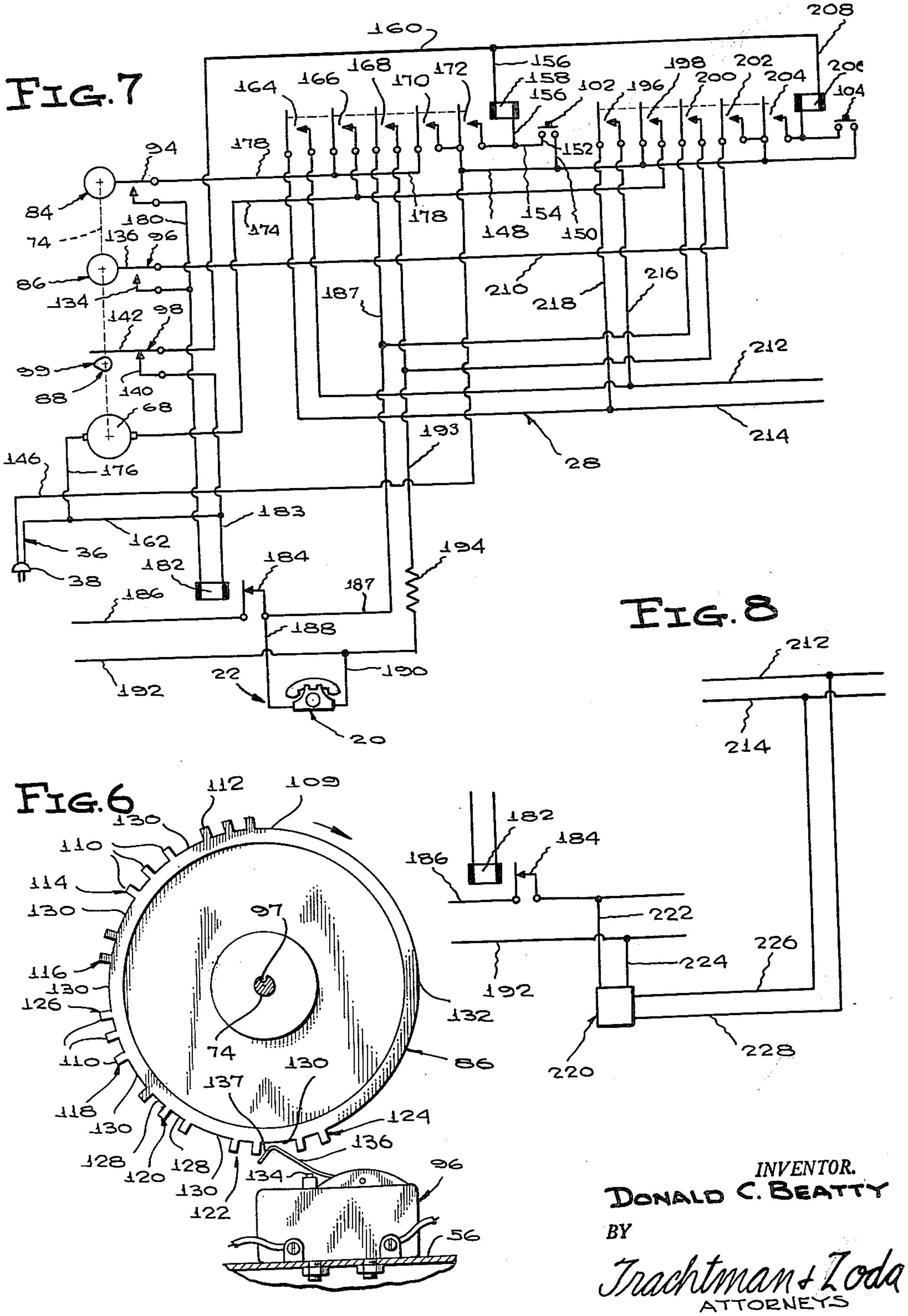
FIGURE 6 is a transverse sectional view showing one of the dialing cam means, taken substantially on line 6—6 of FIGURE 3, on the same scale as FIGURE 3.
FIGURE 7 is a wiring diagram of the device.
FIGURE 8 is a fragmentary wiring diagram showing a modification.

All the sets of projections, considered together, constitute a series 126 of projections, said series curving about the axis of rotation of the disc, as will be readily apparent from FIGURE 6.

It is to be noted that the distance or spacing 128 between adjacent projections 110 of the same set is kept uniform, that is, all projections of a set are spaced uniformly along the periphery of the edge 109.

It is important to note, further, that the space 130 between adjacent sets is greater than the space 128 between adjacent projections of the same set. Of importance, too, is the fact that between the opposite ends of the series there is provided a clear space 132 the angular distance of which is greater than that of any space 130. Space 132 comprises an inertia space, that is, after the entire length of the series has gone by the cam-contacting portion of the associated switch, and the motor has been deenergized, a clear space 132 is desirable to permit further rotational movement of the disc while it is coming to a complete stop, with said movement halting before the leading end of the series of projections again moves into engagement with the associated contact of the switch.

The switches used with the dialing cams are conventional, per se. Each includes contacts 134, 136, which may be appropriately termed fixed and movable contacts respectively. The contacts are normally open, and contact 136 is the form of a leaf having a lip 137 on its distal end. The leaf is disposed in the path of movement of the several projections during rotation of the cam, and each projection, as it engages the leaf, biases the same in a direction outwardly from the cam disc, into engagement with the fixed contact 134. The leaf automatically returns to its normal position thereafter, and could for example be spring-biased to a normal, switch-opening position.

Obviously, during traverse of the leaf 136 by all the projections of the series, the switch will be closed a number of times equal to the number of projections. Further, the closing of the switch will occur at time intervals determined by the spacing of the projections of a particular cam.

In a typical working arrangement, the switch 96 will close a number of times, and at predetermined intervals, corresponding to the number and time intervals between "clicks" of a conventional, manually operated dial mechanism of a telephone intrument.

Thus, and referring to FIGURE 6, in which cam 86 is shown as turning in a clockwise direction when driven by the motor, it will be seen that there are seven sets of projections in the series 126. Set 112 is the leading set in the sense of rotation of the cam. It has three projections, corresponding to the digit "3" of a telephone number. Set 114 also has three projections, providing a second digit "3"; set 116 has two projections, constituting the digit "2"; set 118 has three projections, providing the digit "3"; set 120 also has three projections, providing the digit "3"; set 122 has two projections, providing the digit "2"; and set 124 has two projections, providing the digit "2."

There is thus shown, by way of example, a typical seven-digit telephone number. The first two digits are usually the contraction of the exchange. For example, since the letters "DEF" are provided in the "3" of a telephone dial, the telephone number represented by the dialing cam shown in FIGURE 6 could be "DEcatur 2-3322."

The relative arrangement and spacing of projections on a dialing cam, is, of course, almost limitless. In a commerical embodiment, the dialing cams may be all manufactured identically, with uniformly spaced radial slits over the entire periphery thereof, and with weaken portions at the base of the slits, so that the installer can break away selected portions of the periphery of the device to leave projections 110 of a number and spacing corresponding to the particular telephone number represented by the dialing cam.

Of course, this would mean that the length of the series of one cam will differ from the length of the series of another cam. All the cams, however, are similarly arranged upon the shaft, that is, their inertia spaces all have at least a minimum length, and are in registration. Therefore, whenever motor 68 is deenergized, all the cams will stop rotating at locations such that the leading ends of the series thereof will be properly positioned to be the first parts of the series to engage the associated leaf spring contacts 136 the next time the cams are turned.

At present, I prefer to use a cam having a diameter of about five inches in order to provide sufficient length along the periphery thereof for the maximum number of cam projections, between-set spaces 130, and inertia space 132. Such a cam would require, it is considered, a motor shaft speed of about 7.5 r.p.m. However, it is to be understood that the construction illustrated in FIGURES 3–6 with respect to cams, motor, switches, shaft, and mountings are typical and not the only arrangements that could be employed. It is even possible, it is considered, that the dialing members might have straight line movement, that is, might be rack-like elements provided with motion-translating connections to the motor shaft, such that a dialing cycle might be completed by a particular member responsive to rectilinear movement of the dialing member. Then again, the dialing member might be an endless belt, driven by the motor and having openings formed therein at predetermined intervals, into which openings the leaf spring contact 136 may move during driving of the belt. These several examples are given merely to show that the dialing member, though presently preferred in the illustrated form and considered novel in that form, is recognized by me as having, quite possibly, variations in respect to its shape and motion. The fact is, of course, that the form of the dialing member will be such, in every instance, as to produce the repeated opening and closing of the switch associated therewith, in a manner to cause interruptions in the telephone loop circuit corresponding to those produced during manual dialing of a telephone dial mechanism.

At this point, it is also believed appropriate to note that the word "dialing" as used throughout this application is intended to be used in the broad sense, that is, the sense of operating a mechanism associated with a telephone instrument, in a way to cause the actuation of devices at a central switching station, designed to effect a connection with a distant telephone.

The turn-off cam has a single, rounded cam projection 138. Therefore, during each 360° rotation of the turn-off cam, it will open a normally closed pair of fixed and movable contacts 140, 142 of switch 98. Contact 142 has a roller 144 adapted to bear against the periphery of the turn-off cam.

It will be understood that when projection 138 biases contact 142 to its switch opening position, the motor 68 will be deenergized, as a result. This occurs in a way to be described in greater detail hereinafter. Although at this time the motor is no longer driving the cam 88, said cam will turn through a few more degrees, by reason of the momentum obtained thereby during its single rotation through 360°. Therefore, projection 138 will move past roller 144 to a slight extent, permitting contact 142 to revert to its normal, switch-closing position. Subsequently, when the device again goes into operation, cam 88 will turn with the dialing cams 84, 86, and projection 138 will not come into contact with roller 144 until the series of projections of the dialing cams have traversed their associated switch contacts, through the full length of said series.

It is appropriate now to consider the wiring diagram shown in FIGURE 7.

Assuming that one depresses the push button of switch 102, current will flow through one lead 146 of the power cord 36. A starting circuit is closed by the momentary depression of the push button and said starting circuit is traced as follows: lead 146 from source of power; lead 148; closed contacts 150, 152 of switch 102; lead 154; lead 156; combined starting and holding relay 158; lead 160; the normally closed contacts 140, 142 of switch 98; and return to the source of power through the other lead 162 of the power cord 36.

The momentary closing of the starting circuit traced above establishes a power circuit. Energizing of the winding of relay 158 causes closing of the plurality of sets of contacts 164, 166, 168, 170, and 172. These are normally open, and are arranged to be simultaneously closed responsive to energizing of relay 158.

The power circuit thus established is traced as follows: lead 146 from source of power (the power would ordinarily be the conventional 110 v. A.C.); closed relay holding contacts 172; lead 154; lead 156; winding of relay 158; lead 160; closed switch contacts 140, 142; and return to power source through lead 162.

The power circuit is thus not only established, but is held, since relay 158 will remain energized even though switch 102 now opens following its momentary depression by a user.

The closing of contacts 170 causes the closing of a circuit to and including motor 68. Thus, this motor circuit, closed responsive to closing of the starting circuit but held closed by the power circuit, may be traced as follows: lead 146; closed contacts 170; lead 178; closed motor holding contacts 166; lead 174; motor 68; lead 176; and return to the power source through lead 162.

It is appropriate to note that since the power and motor circuits close simultaneously, remain closed over the same period of time, and open simultaneously, they together define what may appropriately be termed an operating circuit.

Energizing of the motor causes the several cams 84, 86, 88 to start turning. Although all the dialing cams turn together and therefore are all simultaneously operating their particular, associated switches, only one of the dialing cams is dialing the desired number, said one dialing cam being that which corresponds to the particular push button switch used when dialing of a particular number, automatically, is desired. In other words, there will be a different push button switch for each dialing cam. Switch 102 is associated with cam 84, and switch 104 is associated with cam 86. Other switches and other associated cams would be added as necessary.

In any event, in the illustrated example, the switch 102 was depressed. Therefore, interruptions, corresponding to those created in the telephone loop circuit by the ordinary "pulsing" contacts of a conventional dialing mechanism, are created by the cam 84 and associated components. This occurs as follows:

Responsive to the closing of the power circuit, current is permitted to flow as follows, whenever the contacts of switch 94 are closed by the projections of dialing cam 84: lead 146; closed pulsing control contacts 170; lead 178; switch 94; lead 180; the winding of a loop-circuit-controlling relay 182; lead 183; and return to power through lead 162.

Each time relay 182 is energized, it opens its associated, normally closed contacts 184, which are connected to leads 186, 187 respectively of telephone loop circuit 26. The leads 188, 190 of cord 22 extending from telephone instrument 20 are connected to the leads 187, 192 respectively of the telephone loop circuit. Further, it will be seen that lead 187 extends to one of the telephone-loop-circuit-closing contacts 168, so that when these contacts are closed by relay 158, current flows through lead 186, normally closed contacts 184, lead 187, closed contacts 168, lead 193, resistor 194, and lead 192.

One may note at this point that the invention is such that ordinary operation of the dialing mechanism 27 of the telephone instrument is possible whenever desired, in the usual manner and without any requirement for adjustment of any mechanical devices located in proximity to the telephone instrument. One simply dials manually a selected number, and the dialing mechanism 27 will cause interruptions in the telephone loop circuit including leads 186, 188, 190 and 192. If no push button 102 or 104 is depressed, the device simply remains in a standby condition and it does not interfere with normal use of a telephone.

In any event, returning to the discussion of the operation of the device, it will be seen that rotation of cam 84 through 360° causes repeated opening and closing of contacts 184, in direct correspondence with the opening and closing of the contacts of switch 94. Interruptions in the telephone loop circuit, corresponding exactly to those that would be created by the dialing mechanism 27 were this used, are thus caused. Actuation of devices at the telephone central switching station is thus produced, effecting a connection with the desired, distant telephone instrument.

If the switch 104 had been depressed, cam 86 would be the dialing cam that would automatically dial the number. The operation would be the same as that described above, and it will be apparent that any number of switches can be used, with associated components identical to those associated with the respective switches 102, 104.

Thus, to provide a completely clear understanding of how these connections are made and how the current flow is effected, it will be seen that on depression of switch 104, a starting circuit is closed identical to that described above, except that current flows from lead 148 through the contacts of switch 104, to energizing a relay 206 corresponding to relay 158. Relay 206 closes normally open contacts 196, 198, 200, 202, and 204. The starting circuit, traced further, is through lead 208; lead 160; etc.

A power circuit is established by energizing of relay 206, even after switch 104 is released, said power circuit being similar to that first described, and having flow through contacts 204. This permits a circuit to be closed through switch 96, whenever its contacts 134, 136 are closed during rotation of dialing cam 86. In other words, the current from the source of power is through the closed contacts 202, through a lead 210 to the switch 96, relay 182, and return to the source of power through leads 183, 162. Therefore, if switch 104 was the one selected to start the device, the dialing cam 86 is, correspondingly, the one that dials a number.

The motor circuit closed if switch 104 were selected may also be readily traced, and is like that first described, with the exception that the current flow from lead 148 is through contacts 198 and thereafter through lead 174 to the motor.

The windings of relays 158, 206 constitute wholly electrically actuable components of multiple or gang type operating switches, each switch comprising said winding and the several sets of contacts that close responsive to energization of the winding.

It is appropriate to consider certain characteristics of the device, at this time. Among these is the fact that if an ordinary telephone such as shown at 20 is used in conjunction with the apparatus, the transmitter-receiver thereof may be lifted from its cradle by the user prior to his closing the manually operated push button switch. Alternatively, he may if he so desires remove the transmitter-receiver from its cradle during the time the device is already in operation and is in the process of automatically dialing the desired number.

It is also to be noted that whenever manual dialing of a number is in process, the device remains deenergized, and resistance 194 is not energized. This resistance, however, is included in the telephone loop circuit whenever the device is in operation, for the purpose of providing a proper electrical balance or relationship between the invention and the dialing mechanisms provided at the central telephone switching office.

With further reference to FIGURE 7, it is seen that there are leads 212, 214 extending from the respective contacts 164 or 196. These leads are incorporated in the regular circuit of the device, although they serve no function when the device is used in association with an ordinary telephone instrument. Further, the contacts 164 or 196 likewise serve no function at this time. It is desirable from the standpoint from lowering manufacturing costs, however, to include the leads in the device so that instead of an ordinary telephone instrument, other equivalent devices can be used.

This is shown in the diagram included as FIGURE 8. This diagram is a fragment of a complete wiring diagram, and it will be understood that the complete wiring will be identical to that shown in FIGURE 7, except that instead of telephone instrument 20 having leads 188, 190 connected to leads 186, 192, there will be connected to the telephone loop circuit a device 220. This device is illustrated diagrammatically, and is conductively coupled to the sides of the loop circuit by leads 222, 224. This device is also connected to leads 212, 214 through the medium of leads 226, 228 respectively.

The device 220 shown in FIGURE 8 would be a sound amplifying apparatus for telephone circuits, such as that covered by U.S. Patent No. 2,786,099, issued to me on March 19, 1957. Such a device needs a separate connection to a source of electrical power, and this is provided by the leads 212, 214, which would extend to such a source independently of the leads 146, 162.

A device such as shown in the mentioned patent would have value, when used in association with an automatic dialing device such as illustrated and described herein, in that it includes a microphone, which may pick up sounds in the area in which it is installed. This would be of value when the invention is associated with burglar alarm systems, etc. Both the telephone 20 and sound amplifying apparatus 220 can be considered as "telephone instruments" within the meaning of this term as used in the appended claims.

Figures 9, 10:
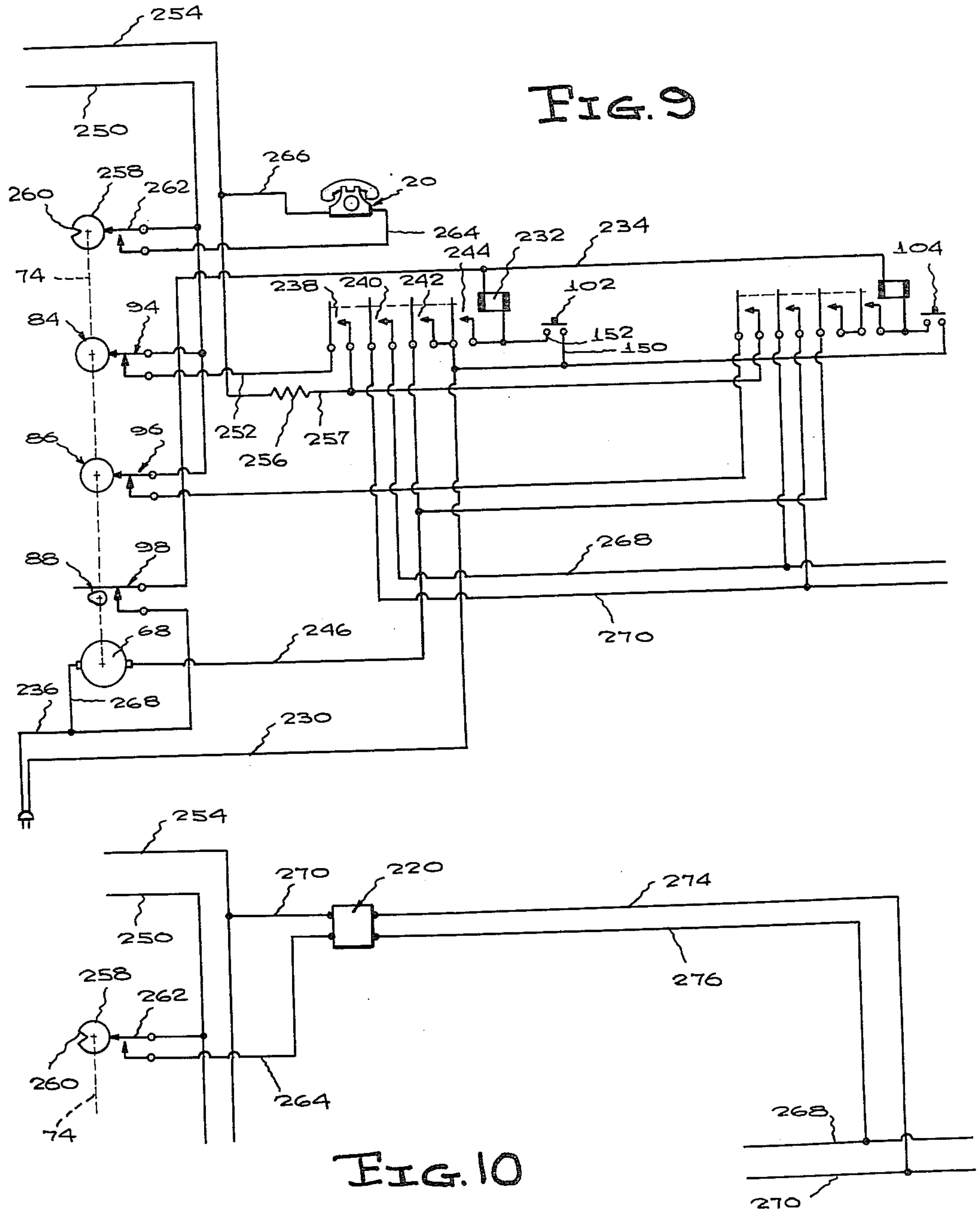
FIGURE 9 is a wiring diagram of another form of the invention.
FIGURE 10 is a fragmentary wiring diagram showing a slight modification of the construction illustrated schematically in FIGURE 9.

In FIGURE 9, there is shown a modified circuit arrangement which is similar in respect to its basic essentials to that shown in FIGURE 7. The main difference between the two circuits resides in the fact that the circuit of FIGURE 9 includes means to automatically disconnect an associated telephone or equivalent apparatus from the telephone loop circuit whenever the invention is placed in operation for the purpose of automatically dialing a desired telephone number. A further difference of some materiality is found in the fact that the switches 94, 96 are normally closed, and are included directly in the telephone loop circuit when the device is in operation, as distinguished from the FIGURE 7 arrangement in which they are normally open, and are not in the loop circuit but rather, operate relay 182 to operate, in turn, contacts 184. In this regard, it is to be noted that whenever switch 94 is included in the loop circuit to create interruptions therein, switch 96 and any other switches associated with dialing cams are not so included. The same is true whenever switch 96 is included, etc.

Assuming that switch 102 is momentarily closed, power would flow through one power lead 230; closed contacts 150, 152; relay 232; lead 234; normally closed switch 98; and return to power through lead 236. This completes the starting circuit.

Relay 232 operates to close normally open contacts 238, 240, 242, and 244. This closes a power circuit, as follows: lead 230; contacts 244; relay 232; lead 234; switch 98; and lead 236.

This closes a motor circuit, as follows: lead 230; contacts 242; lead 246; motor 68; lead 268; and lead 236.

Since switch 102 was selected for starting the device, dialing cam 84 dials the number. Interruptions for this purpose are created in a circuit, traced as follows:

One lead 250 of the telephone loop circuit; switch 94; lead 252; contacts 238; lead 257; resistance 256; and out through lead 254.

As previously noted, this form of the invention includes means to disconnect the telephone instrument from the loop circuit. This disconnection is effected whenever the device begins operation, and remains in effect until the dialing is completed. The purpose is to remove any electrical "loading" (capacitance, resistance, and/or inductance) which may be added by a telephone 20 or equivalent apparatus 220 during the automatic dialing operation.

The means referred to includes cam disc 258, driven by motor 68 along with the dialing cams and the turn-off cam. Cam disc 258 has a deep, V-shaped cam notch 260. Extending adjacent to the periphery of disc 258 is a movable contact of a switch 262, said movable contact being connected with lead 250. A fixed contact of this switch is connected by means of a lead 264 to the telephone instrument 20, said instrument having a second lead 266 extending to the lead 254.

Only when the movable contact of switch 262 is permitted to drop into notch 260 is there a connection between the telephone instrument and the loop circuit. And, this occurs only when the motor is deenergized following completion of the dialing operation. The start and the final positions, in other words, of the cam 260 are the same, with the movable contact of switch 262 seated in notch 260 and switch 262 closed to permit normal use of the telephone instrument.

It will be seen that the device has the further characteristic when made as in FIGURE 9, of eliminating relay 182 and its associated contacts 184. Instead, the contacts of switch 94 or switch 96, as the case may be, discharge the direct functions of the contacts 184, being connected directly in the loop circuit during dialing of a number.

The tracing of the circuits, if switch 104 is selected for depression, will be fully apparent from the above description and is thought unnecessary herein.

FIGURE 10 shows a fragmentary portion of a wiring arrangement, it being understood that the complete diagram would be identical to that of FIGURE 9, except that instead of instrument 20, instrument 220 would be used. In this arrangement, leads 268, 270 would correspond to the leads 212, 214, and leads 274, 276 would be connected therewith and with the device 220. Lead 264 in this arrangement would be connected to the device 220, and a lead 270 would be connected between a device 220 and lead 254.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any change in construction that may be permitted within the scope of the appended claims.

Having thus described my invention, I claim as new, and desire to protect by Letters Patent:

1. Apparatus for dialing any one of a plurality of preselected telephone numbers comprising, in combination with a pair of power supply leads adapted for connection to opposite sides of a source of electricity, and with a telephone loop circuit including a pair of conductors: a telephone instrument having a pair of telephone leads connected to the respective conductors of the loop circuit; a normally closed power disconnect switch in one of the power supply leads; a drive motor the terminals of which have connections to the respective power supply leads; a plurality of operating circuits of like circuit configuration, one for each of said telephone numbers, each circuit including a relay the terminals of which have connections to the respective power supply leads, said relay including a pair of normally open holding contacts for the relay in one of said relay connections, a pair of normally open holding contacts for the motor in one of said motor connections, and a pair of normally open loop-circuit-closing contacts connected between said conductors, each operating circuit further including a normally open momentary starting switch connected between one terminal of the relay and one of the power supply leads, whereby to produce initial closure of a circuit through the relay and power supply leads responsive to momentary closure of the starting switch, thus to effect closure of the relay holding contacts, motor holding contacts, and loop-circuit-closing contacts substantially simultaneously with said momentary closure of the starting switch, thereby closing and maintaining circuits through the relay, drive motor, and telephone loop circuit, each operating circuit further including a set of contacts arranged to pulse said loop circuit correspondingly to the pulsing thereof normally effected by manual operation of a telephone dial during dialing of a number; a series of cam disks, one for each operating circuit, mounted for simultaneous, conjoint driving of the same by the motor, each disk including a peripheral series of projections individually disposed to bias the pulsing contacts of the associated operating circuit during rotation of the disk, said projections being arranged in circumferentially spaced sets each of which includes projections corresponding in number to the value of a digit of the telephone number to be dialed, whereby to bias the pulsing contacts the required number of times, and at the required intervals, proper for the dialing of a number represented by the selected starting switch; and a power turn-off cam driven by the motor conjointly with the several disks and arranged to open the power-disconnect switch following rotation of said disks through 360°.

2. Apparatus as in claim 1 wherein the several disks comprise initially identical members having uniformly spaced radial slits and weakened portions at the inner ends of the slits, whereby to permit the breaking off of selected peripheral portions of the disks during installation of the apparatus at the site of said installation to leave on each disk projections corresponding in number and spacing to the particular telephone number represented by the disk.

3. Apparatus for dialing any one of a plurality of preselected telephone numbers comprising, in combination with a pair of power supply leads adapted for connection to opposite sides of a source of electricity, and with a telephone loop circuit including a pair of conductors: a telephone having a pair of telephone leads one of which is connected directly to one of said conductors; a normally closed telephone disconnect switch connected between the other telephone lead and the other conductor of said circuit; a normally closed power-disconnect switch in one of the power supply leads; a drive motor the terminals of which have connections to the respective power supply leads; a plurality of operating circuits of like circuit configuration, one for each of said telephone numbers, each circuit including a relay the terminals of which have connections to the respective power supply leads, said relay including a pair of normally open holding contacts for the relay in one of said relay connections, a pair of normally open holding contacts for the motor in one of said motor connections, and a pair of normally open loop-circuit-closing contacts connected between said conductors of the loop circuit, each operating circuit further including a normally open momentary starting switch connected between one terminal of the relay and one of the power supply leads, whereby to produce initial closure of a circuit through the relay and power supply leads responsive to momentary closure of the starting switch, thus to effect closure of the relay holding contacts, motor holding contacts, and loop-circuit-closing contacts substantially simultaneously with said momentary closure of the starting switch, thereby closing and maintaining circuits through the relay, drive motor, and telephone loop circuit, each operating circuit further including a pair of normally closed pulsing contacts disposed in series connection with the loop-circuit-closing contacts so as to pulse the telephone loop circuit when biased between open and closed positions; a plurality of rotary cam disks, one for each operating circuit, mounted for simultaneous, conjoint driving of the same by the motor, each disk including a peripheral series of projections individually disposed to bias to open position the pulsing contacts of the associated operating circuit during rotation of the disk, said projections being arranged in circumferentially spaced sets each of which includes projections corresponding in number to the value of a digit of the telephone number to be dialed; means operating in response to said initial closure of a circuit through the power leads to bias said telephone-disconnect switch to an open position in which it disconnects the telephone instrument wholly from the telephone loop circuit simultaneously with said initial circuit closure, said means responding to rotation of the disks through 360° to operate the telephone-disconnect switch to its closed position, for re-connecting said device to the loop circuit following dialing of the complete number; and a power turn-off cam driven by the motor conjointly with the several disks and arranged to open the power-disconnect switch following rotation of said disks by the motor through 360°.

4. Apparatus for dialing any one of a plurality of preselected telephone numbers comprising, in combination with a pair of power supply leads adapted for connection to opposite sides of a source of electricity, and with a telephone loop circuit including a pair of conductors: a telephone instrument having a pair of telephone leads connected to the respective conductors of the loop circuit; a normally closed power disconnect switch in one of the power supply leads; a drive motor the terminals of which have connections to the respective power supply leads; a plurality of operating circuits of like circuit configuration, one for each of said telephone numbers, each circuit including a relay the terminals of which have connections to the respective power supply leads, said relay including a pair of normally open holding contacts for the relay in one of said relay connections, a pair of normally open holding contacts for the motor in one of said motor connections, and a pair of normally open loop-circuit-closing contacts connected between said conductors, each operating circuit further including a normally open momentary starting switch connected between one terminal of the relay and one of the power supply leads, whereby to produce initial closure of a circuit through the relay and power supply leads responsive to momentary closure of the starting switch, thus to effect closure of the relay holding contacts, motor holding contacts, and loop-circuit-closing contacts substantially simultaneously with said momentary closure of the starting switch, thereby closing and maintaining circuits through the relay, drive motor, and telephone loop circuit, each operating circuit further including a set of contacts arranged to pulse said loop circuits correspondingly to the pulsing thereof normally effected by manual operation of a telephone dial during dialing of a number, each operating circuit further including a set of normally open pulsing control contacts connected between one of said power supply leads and said pulsing contacts of the operating circuit and closed by said relay; a second relay including a winding connected between the other power supply lead and each of the several sets of pulsing contacts, said last-named relay including a set of normally closed contacts connected in the loop circuit to effect the pulsing of the same, upon alternate energization and de-energization of said winding of the last-named relay in response to biasing of the pulsing contacts between open and closed positions; a series of cam disks, one for each operating circuit, mounted for simultaneous, conjoint driving of the same by the motor, each disk including a peripheral series of projections individually disposed to bias the pulsing contacts of the associated operating circuit during rotation of the disk, said projections being arranged in circumferentially spaced sets each of which includes projections corresponding in number to the value of a digit of the telephone number to be dialed, whereby to bias the pulsing contacts the required number of times, and at the required intervals, proper for the dialing of a number represented by the selected starting switch; and a power turn-off cam driven by the motor conjointly with the several disks and arranged to open the power-disconnect switch following rotation of said disks through 360°.

5. Apparatus for dialing any of a plurality of preselected telephone numbers comprising, in combination with a pair of power supply leads connected to a source of electricity, and with a telephone loop circuit including a pair of conductors: a telephone instrument having a pair of telephone leads connected to the respective conductors; a normally closed power disconnect switch connected in one of said leads; a drive motor connected between the respective power supply leads; a plurality of operating circuits of like circuit configuration, one for each of said telephone numbers, each circuit including a relay the winding of which is connected between said power leads, said relay including a pair of normally open relay holding contacts connected in series with the winding between said power supply leads, each operating circuit further including a pair of normally open motor holding contacts in series with the motor between said power supply leads, and a pair of normally open loop-circuit-closing contacts series-connected in said loop circuit, each operating circuit further including a normally open momentary starting switch in shunt across the relay holding contacts, for initial closure of a circuit through said winding responsive to momentary closure of said starting switch with resultant closure of the relay holding, motor holding, and loop-circuit-closing contacts substantially simultaneously with one another and with the starting switch, thereby to simultaneously close and maintain circuits through the relay, drive motor, and telephone loop circuit, each operating circuit further including a set of contacts in pulsing relation to the loop circuit; a series of disks, one for each circuit, linked for joint driving thereof by the motor, each disk including means biasing the pulsing contacts of its operating circuit through a full number-dialing cycle in response to a single 360° rotational movement of said disk; and a power turn-off cam driven by the motor conjointly with the several disks and arranged to open the power-disconnect switch following said 360° rotation of the disks.

6. Apparatus as in claim 5 wherein the pulsing contacts of each operating circuit are normally closed and are in series connection with said normally open loop-circuit-closing contacts of the same operating circuit.

7. Apparatus as in claim 6, further including a set of normally closed telephone-disconnect contacts series-connected in one of the telephone leads between said telephone instrument and the loop circuit; and a telephone-disconnect cam driven by the motor conjointly with the cam disks and shaped to hold said telephone-disconnect contacts in open position through the full duration of said dialing cycle.

8. Apparatus as in claim 5, further including a second relay the winding of which is in series with each set of loop-circuit-pulsing contacts, thus to be alternately energized and deenergized in response to the bias of the pulsing contacts of any selected operating circuit, said second relay including a set of contacts connected in the loop circuit so as to pulse the same responsive to the energization and deenergization of the second-named relay.

9. Apparatus as in claim 8 wherein each operating circuit further includes a set of normally open pulsing control contacts operated by the first-named relay, and disposed in series connection with the winding of the last-named relay and with the pulsing contacts of the same operating circuit, whereby to permit current flow through the pulsing contacts of an operating circuit only when the relay thereof is energized.

References Cited in the file of this patent

UNITED STATES PATENTS

| | | |
|---|---|---|
| 1,933,089 | Battegay | Oct. 31, 1933 |
| 2,098,133 | Carnahan | Nov. 2, 1937 |
| 2,576,189 | Olliver | Nov. 27, 1951 |
| 2,892,897 | Vidal | June 30, 1959 |